United States Patent Office 3,703,360
Patented Nov. 21, 1972

3,703,360
GASOLINE ADDITIVE AND COMPOSITION
Warren L. Perilstein, Orchard Lake, Mich., assignor to Ethyl Corporation, New York, N.Y.
No Drawing. Continuation-in-part of application Ser. No. 856,147, Sept. 8, 1969. This application Aug. 21, 1970, Ser. No. 66,124
Int. Cl. C10l *1/22*
U.S. Cl. 44—63
61 Claims

ABSTRACT OF THE DISCLOSURE

Gasoline containing (1) a salt of an organophosphoric acid and an organic amine, and (2) an olefin hydrocarbon having an average molecular weight of from about 350 to about 1500; and an additive concentrate which is a combination of (1) and (2). The gasoline composition prevents and reduces excessive deposit build-up in internal combustion engines particularly on the underhead portion of the intake valves. The composition also is an effective carburetor detergent.

CROSS REFERENCE TO RELATED APPLICATION

This application is a continuation-in-part of Ser. No. 856,147, filed Sept. 8, 1969, now abandoned.

BACKGROUND OF THE INVENTION

The present invention is directed to gasoline compositions containing a novel combination of additives which effectively reduces undesirable engine deposits and is an effective carburetor detergent and anti-icer. The novel combination of additives comprises an amine/phosphoric acid salt and a high molecular weight olefin hydrocarbon.

Deposits which tend to form and build up in various sections of an internal combustion engine reduce the engine efficiency and can contribute to increasing undesirable exhaust emissions. Removal of and/or prevention of this deposit build-up in the carburetor and in the engine intake system especially on the underhead side of the intake valves is of obvious practical importance.

It has been discovered that a combination of an amine/phosphoric acid salt and an olefin hydrocarbon when added to gasoline effectively reduces deposit formation and/or build up in the intake system and the carburetor of an internal combustion engine.

SUMMARY OF THE INVENTION

Gasoline containing a novel combination of an organo phosphoric acid salt of an amine and a high molecular weight olefin hydrocarbon. The gasoline composition effectively reduces undesirable deposits in the carburetor and intake system of an internal combustion engine and also acts as an anti-icer.

DESCRIPTION OF THE PREFERRED EMBODIMENTS

An embodiment of this invention is gasoline containing (1) an organo substituted phosphoric acid salt of an amine, (2) an olefin hydrocarbon having the molecular weight of at least 350 and preferably between 350 and 1500. It is preferred that the concentration in gasoline of the phosphoric acid salt be about 10 to about 100 parts per million by weight (p.p.m.); and that the concentration of the olefin hydrocarbon be between 100 and 4000 p.p.m.

Preferred phosphoric acid salts are those prepared from an alkyl phosphoric acid having the formula

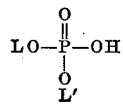

wherein L and L' are independently selected from hydrogen and alkyl groups having from 1 to 20 carbon atoms such that at least one of L and L' is (a) an alkyl group, and (2) organic amines selected from the compounds having the formulae (i)

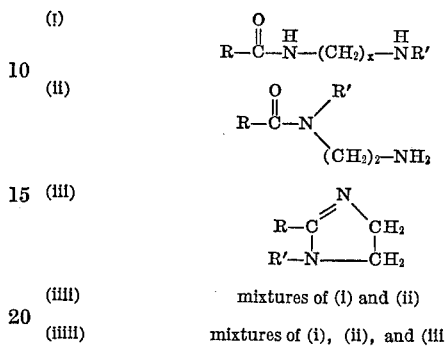

(iiii)               mixtures of (i) and (ii)

(iiiii)         mixtures of (i), (ii), and (iii)

wherein R is an acyclic hydrocarbon radical having 11 to 19 carbon atoms, R' is selected from the group consisting of hydrogen, $C_2$–$C_4$ alkyl, 2-hydroxyethyl, and 2-aminoethyl, and x is an integer selected from 2 and 3.

Preferred olefin hydrocarbons are those obtained by polymerizing a mixture of monoolefins in the $C_{12}$ and higher carbon number range using a Friedel-Crafts catalyst.

Organo-substituted phosphoric acids suitable for preparing the aforesaid salts are orthophosphoric acids which have at least one organic hydrocarbon substituent such as aryl, cycloalkyl or alkyl radical. Examples of such phate, ditolyl hydrogen phosphate, cyclohexyl dihydrogen phosphate, dibenzyl dihydrogen phosphate, and the like. The preferred organo substituted phosphoric acids are alkyl substituted phosphoric acids represented by Formula I above. Examples of useful alkyl phosphoric acids are dimethyl hydrogen phosphate, eicosyl dihydrogen phosphate, cyclooctyl dihydrogen phosphate, diisobutyl hydrogen phosphate, pentadecyl dihydrogen phosphate, diheptyl hydrogen phosphate, mixtures of such alkyl phosphoric acids and the like. More preferred alkyl phosphoric acids are those wherein the alkyl group has from 8 to about 20 carbon atoms and most preferably from 8 to about 15 carbon atoms. Examples of more preferred alkyl phosphoric acids are dioctyl hydrogen phosphate, dieicosyl hydrogen phosphate, undecyl dihydrogen phosphate, 2,4,6-trimethyl - n - nonyl dihydrogen phosphate, diocta-decyl hydrogen phosphate and mixtures of such phosphoric acids. Phosphoric acids which exemplify the most preferred range are octyl dihydrogen phosphate, di-n-nonyl hydrogen phosphate, pentadecyl dihydrogen phosphate, dodecyl dihydrogen phosphate, tridecyl dihydrogen phosphate, ditridecyl hydrogen phosphate and mixtures of such phosphoric acids.

The organic amines which are used to prepare the above identified salts are preferably those represented by the formulae above and mixtures thereof. More preferred amines are those in which R is a hydrocarbon alkenyl radical containing from 11 to 19 carbon atoms; R' is 2-hydroxyethyl and x is 2.

These organic amines may be prepared using methods known in the art. (See Wilson U.S. 2,267,965; Wilkes U.S. 2,214,152; Hinkamp U.S. 3,035,906; and Barusch et al. U.S. 2,839,373.) They are conveniently prepared by condensation of a suitable fatty acid with a suitable alkylene polyamine. The type of organic amine obtained during the condensation reaction is controlled to some extent by the number of moles of water eliminated during the condensation. Thus, when one mole of water is eliminated during the condensation reaction compounds of Formulae i and ii are obtained, while the elimination of two moles of water during the condensation results in compounds of the type illustrated by Formula iii. Suitable amines are prepared by the condensation of acids such as lauric, myristic, stearic, linoleic acids, mixtures of acids obtained from hydrolysis of natural products such as babassu oil, palm oil, coconut oil, tall oil and the like, with an alkylene diamine such as N-propyl-1,4-butylenediamine,
N-(4-hydroxybutyl)-1,3-propylenediamine,
N-ethylpropylenediamine,
N-2-aminoethylethylenediamine,
N-tert-butyl-1,2-ethylenediamine,
N-ethyl-1,2-ethylenediamine,
N-3-aminopropyl-1,4-butylenediamine and preferably N-2-hydroxyethylethylenediamine.

The salts of the organic phosphoric acids and organic amines described above are prepared in any conventional manner. The salts can be prepared by simply mixing the particular organic amine:phosphoric acid in a molar ratio of 2:1 through 1:2. Ordinarily, amine:phosphoric acid salt in which the molar ratio is about 1:1 is preferred.

A general description of useful amine salts and their preparation is contained in U.S. 2,974,022, issued Mar. 7, 1961. This disclosure is incorporated hereby by reference.

The hydrocarbon olefin useful in the present invention is non-aromatic, normally liquid olefin hydrocarbon characterized by having an average molecular weight ranging from 350; a preferred molecular weight range is 350 to about 1500. By normally liquid is meant that the olefin hydrocarbon is fluid at room temperature. These olefin hydrocarbons include cyclic olefin hydrocarbons as well as branched chain and straight chain olefin hydrocarbons.

Although olefin hydrocarbons useful as additives may contain only one carbon number species, for example, triacontene ($C_{30}$), pentacontene ($C_{50}$), a $C_{100}$ olefin and the like, preferred olefin hydrocarbons are mixtures of olefins having at least 16 or more and preferably at least 24 or more carbon atoms. The mixtures of olefins which make up these preferred olefin hydrocarbons may be obtained directly from commercial processes such as Ziegler catalyst ethylene and/or propylene polymerization; dehydrohalogenation of suitable alkyl halides; the catalytic dehydrogenation of suitable paraffins, for example, wax cracked paraffins, or oligomerization of suitable olefins; or other similar processes.

Particularly preferred olefin hydrocarbon additives are those obtained by polymerizing non-aromatic, primarily α, monoolefin mixtures having 8 or more, and preferably 12 or more carbon atoms. By predominantly α is meant that more than 50% by weight of the monoolefin mixture have the α configuration.

The polymerization of these monoolefins can be effected with various catalyst systems. Useful polymerization procedures are disclosed, for example, in U.S. 2,620,365, U.S. 3,206,523, U.S. 3,232,883, U.S. 3,252,771, U.S. 3,253,052, U.S. 3,259,636, U.S. 3,261,879, U.S. 3,322,848, U.S. 3,325,560, U.S. 3,330,883, U.S. 3,346,662, and U.S. 3,450,786. The olefin hydrocarbon products prepared using procedures such as those described in the patents listed may be useful as additives in the gasoline of the present invention provided that the product has the required average molecular weight, is normally liquid, and is non-aromatic in nature.

A most preferred normally liquid non-aromatic olefin hydrocarbon is the product obtained by polymerizing a mixture of even carbon numbered, predominantly α, monoolefins having from 12 to 32 carbon atoms using a Friedel-Crafts catalyst, preferably selected from aluminum chloride, aluminum bromide, and boron trifluoride, at reaction temperatures ranging from 0° C. to about 145° C. A most preferred polymerization is carried out in the absence of any lower alkyl ($C_1$–$C_6$) halide such as methylchloride, n-hexylchloride, isopropylchloride, ethylchloride and the like, at temperatures ranging from 20° C.–110° C. $AlCl_3$ and $AlBr_3$ are most preferred catalysts.

The polymerization reaction is ordinarily carried out without the addition of any inert diluent. However, the polymerization can be carried out in the presence of an inert diluent, e.g., an alkane, if desired.

The polymerization reaction time is to a degree dependent on the monoolefin feed stream, the reaction temperature, the catalyst concentration and the like. For example, when aluminum chloride is used as the catalyst, at a reaction temperature of 70° C. with an olefin feed containing $C_{12}$–$C_{32}$ olefins, reaction times of 5 to 15 minutes can be sufficient. In general, reaction times can be varied as required by different reaction systems to prepare suitable olefin hydrocarbon polymers.

The preferred Friedel-Crafts catalysts are aluminum halides and especially aluminum chloride. The concentration of catalyst used may be varied. Generally up to about 10% of the catalyst based on the weight of monoolefin charged can be used; 2% to 10% is a more useful range. About 5% of the catalyst based on the weight of the olefin charged is conveniently used.

The monoolefins which can be polymerized using the Friedel-Crafts process described above are mixtures of acyclic monoolefins having from about 12 to about 32 carbon atoms. By olefins is meant olefin hydrocarbons. These monoolefin mixtures are synthesized by methods known in the art. For example, they may be prepared by cracking wax paraffins; by catalytically dehydrogenating paraffinic hydrocarbons; or by polymerizing low molecular weight monoolefins such as ethylene, using Ziegler-type catalysts. It is the general nature of these monoolefin preparations that mixtures of monoolefins are obtained. These monoolefin mixtures can vary widely in composition from 100% α-monoolefins, through intermediate mixtures, to 100% internal monoolefins; mixtures which contain 30% or more α-monoolefins are preferred. The range of carbon chain lengths in these mixtures can also vary considerably. Both branched and linear olefins can be present in these mixtures. Useful mixtures can also contain small amounts of monoolefins outside the $C_{12}$–$C_{32}$ range. Mixtures in which α-monoolefins predominate are more preferred. By predominate is meant that more than 50% by weight of the olefin mixture is α-monoolefin. In addition to the monoolefins, the mixture can also contain small quantities of certain by-products (or co-product). The type of by-product or co-product found in the α-monoolefin mixtures will depend to a great degree on the method used to prepare the monoolefins. Thus, for example, if the monoolefin mixture is prepared by catalytic dehydrogenation of paraffins in the $C_{12}$–$C_{32}$ range, the monoolefin mixture may contain some of the starting paraffin while with Ziegler catalyzed ethylene systems, the by-product present in the monoolefin may be paraffins as well as higher molecular weight alkanols. Generally, the monoolefin mixtures containing these by-products can be used as such; provided the presence of the by-product does not adversely affect the Friedel-Crafts polymerization reaction and olefin hydrocarbon product.

Examples of useful monoolefin mixtures are those having the following monoolefin composition by weight: 30% $C_{12}$, 40% $C_{14}$, and 30% $C_{16}$; 10% $C_{13}$, 20% $C_{14}$, 25% $C_{15}$, 25% $C_{16}$, 15% $C_{17}$ and 5% $C_{18}$; 2% $C_9$, 3% $C_{10}$, 5% $C_{11}$, 30% $C_{12}$, 35% $C_{13}$, 20% $C_{14}$ and 5% $C_{15}$; 30% $C_{12}$, 30% $C_{14}$ and 40% $C_{16}$; 1% $C_8$, 2% $C_{10}$, 15% $C_{12}$, 22% $C_{14}$, 24% $C_{16}$, 20% $C_{18}$, 10% $C_{20}$, 4% $C_{22}$ and 2% $C_{24}$; 50% $C_{22}$ and 50% $C_{24}$; 20% $C_{26}$, 60% $C_{28}$ and 20% $C_{30}$; 5% $C_{23}$, 15% $C_{24}$, 30% $C_{25}$, 32% $C_{26}$, 10% $C_{27}$ and 8% $C_{28}$; 11% $C_{16}$, 63% $C_{18}$, 20% $C_{20}$ and 6% $C_{22+}$; 6% $C_{26}$, 15% $C_{28}$, 40% $C_{30}$, 36% $C_{32}$ and 3% $C_{34}$, and the like.

Preferred mixtures of monoolefins contain even carbon numbered olefins ranging from about $C_{12}$ to about $C_{32}$ with an α-monoolefin content of 30% or more. These mixtures may contain small amounts of $C_6$, $C_8$ and $C_{10}$ olefins as well as $C_{34+}$ or higher olefins; as well as paraffin and alkanol by-products as described above.

More preferred mixtures of monoolefins are those containing even carbon numbered olefins, ranging from about $C_{12}$ to about $C_{32}$; the olefins are predominantly α-monoolefins. These mixtures can also contain small amounts of $C_6$, $C_8$ and $C_{10}$ olefins as well as $C_{34}$ and higher olefins; as well as paraffin and alkanol by-products as described above.

Compositions of typical preferred monoolefin mixtures useful for Friedel-Crafts polymerization are listed in the following table. These preferred monoolefins will be designated herein as $C_{12+}$ monoolefins or $C_{12+}$ monoolefin mixtures.

TABLE 1.—$C_{12+}$ MONOOLEFIN MIXTURES, PERCENT BY WEIGHT (1)

| Olefin carbon No.: | A | B | C | C' |
|---|---|---|---|---|
| $C_8$-$C_{10}$ | 1.84 | 1.40 | 2.01 | 4.35 |
| $C_{12}$ | 20.39 | 16.72 | 19.40 | 13.92 |
| $C_{14}$ | 12.15 | 9.76 | 12.59 | 9.91 |
| $C_{16}$ | 10.65 | 8.28 | 10.97 | 9.27 |
| $C_{18}$ | 6.29 | 6.34 | 8.88 | 9.51 |
| $C_{20}$ | 4.35 | 4.43 | 5.15 | 6.04 |
| $C_{22}$ | 3.25 | 5.59 | 6.63 | 7.51 |
| $C_{24}$ | 4.38 | 7.50 | 7.70 | 8.21 |
| $C_{26}$ | 3.51 | 6.41 | 4.78 | 5.80 |
| $C_{28}$ | 2.07 | 3.69 | 2.40 | 3.00 |
| $C_{30}$ | 1.33 | 1.25 | 0.90 | 0.61 |
| $C_{32}$ |  | 0.38 | 0.17 |  |
| $C_{34}$ |  | 0.08 |  |  |
| Total olefins, percent | 70.21 | 72 | 81.58 | 78.13 |
| Total paraffins, percent | 18.30 | 28 | 18.42 | 21.87 |
| Other by-products, percent | ³11.49 |  |  |  |
| Olefin configuration, percent distribution: ⁴ |  |  |  |  |
| α, percent | 69.7 | 60.6 |  | 60.1 |
| Internal, percent | 30.3 | 39.3 |  | 39.9 |

¹ Vapor phase chromatographic analysis.
² For this mixture, VPC analysis was based on 91.11% recovered normalized. The mixture also contained by-product alcohols.
³ Estimated.
⁴ Nuclear magnetic resonance analysis.

A typical mixture of $C_{12+}$ monoolefins has the following general composition by weight: $C_8$-$C_{10}$ olefins—3%, $C_{12}$-$C_{18}$ olefins—39.2%, $C_{20+}$ olefins—33.6%, $C_8$-$C_{10}$ paraffins—2%, $C_{12}$-$C_{18}$ paraffins—19.4%, $C_{20+}$ paraffins—0.8%, alcohols—2%.

A general composition range for another preferred monoolefin mixture comprises a mixture containing by weight 0–3% $C_{12}$, 8–35% $C_{14}$, 15–30% $C_{16}$, 8–25% $C_{18}$, 4–15% $C_{20}$, 4–15% $C_{22}$, 4–15% $C_{24}$, 0–10% $C_{26}$, 0–10% $C_{28}$, 0–5% $C_{30}$, 0–5% $C_{32+}$; the components being 60–90% olefins (30%, 70% of which are alpha), 10–35% paraffins and 0–5% alcohols. This type of monoolefin mixture will be designated herein as a $C_{14+}$ monoolefin mixture.

Following is a table of useful $C_{14+}$ monoolefin mixtures.

TABLE 2.—$C_{14+}$ MONOOLEFIN MIXTURES

| Olefin carbon No. | D | E | F |
|---|---|---|---|
| $C_{12}$ | 0.1 | 0.3 | 3 |
| $C_{14}$ | 10.4 | 26.5 | 25 |
| $C_{16}$ | 23.3 | 58.0 | 30 |
| $C_{18}$ | 18.3 | 12.9 | 15 |
| $C_{20}$ | 8.5 |  | 8 |
| $C_{22}$ | 8.6 |  | 6 |
| $C_{24}$ | 11.4 |  | 5 |
| $C_{26}$ | 9.9 |  | 3 |
| $C_{28}$ | 5.7 |  | 2 |
| $C_{30}$ | 2.8 |  | 2 |
| $C_{32}$ | 1.0 |  | 1 |
| Olefin configuration: |  |  |  |
| α vinyl, percent | 31.6 |  |  |
| α vinylidene, percent | 29.7 | 50 | 50 |
| Internal, percent | 22.8 |  |  |
| Non-olefin components,¹ percent | 15.9 | 2.3 | 12 |

¹ By-product paraffins and alkanols.

Another preferred monoolefin mixture contains monoolefins, 30%–70% of which are alpha olefins, of even carbon number ranging from $C_{18}$-$C_{28+}$. Again, small amounts of olefins outside this range as well as by-products can also be present. These preferred monoolefin mixtures will be referred to herein as $C_{18+}$ monoolefins or $C_{18+}$ monoolefin mixtures. A general composition range of these $C_{18+}$ monoolefins is set out in the following table.

TABLE 3.—$C_{18+}$ MONOOLEFIN COMPOSITION RANGE

| Olefin carbon No.: | Percent by weight ¹ |
|---|---|
| $C_{16-}$ ² | 0–6 |
| $C_{18}$ | 0.5–22 |
| $C_{20}$ | 32–55 |
| $C_{22}$ | 18–39 |
| $C_{24}$ | 6–16 |
| $C_{26}$ | 0.5–8 |
| $C_{28+}$ ³ | 0–10 |
| Paraffins | 0–10 |
| Olefin configuration, percent distribution ⁴: |  |
| α Vinyl | 30–55 |
| α Vinylidene | 0–55 |
| Internal | 10–70 |

¹ Vapor phase chromatographic (VPC) analysis.
² $C_{16-}$ includes $C_{16}$ and lower olefins; but essentially no olefins lower than about $C_{12}$.
³ $C_{28+}$ includes $C_{28}$ and higher olefins.
⁴ Nuclear magnetic resonance (NMR) analysis.

Specific examples of $C_{18+}$ monoolefin compositions are given in the following table.

TABLE 4.—$C_{18+}$ MONOOLEFIN MIXTURES, PERCENT BY WEIGHT ¹

| Olefin carbon No. | G | H | I | J | K | L | M | N |
|---|---|---|---|---|---|---|---|---|
| $C_{16}$ |  |  | 0.17 | 0.08 | 0.08 | 0.41 | 3.0 | 11 |
| $C_{18}$ | 5.06 | 0.50 | 9.50 | 6.19 | 4.34 | 10.83 | 16.7 | 63 |
| $C_{20}$ | 50.12 | 42.66 | 47.69 | 45.79 | 49.31 | 41.06 | 33.2 | 20 |
| $C_{22}$ | 28.55 | 37.10 | 26.85 | 29.58 | 30.31 | 24.42 | 19.6 | 6 |
| $C_{24}$ | 11.33 | 14.38 | 11.19 | 13.56 | 11.75 | 11.56 | 13.2 |  |
| $C_{26}$ | 4.22 | 0.80 | 13.54 | 4.13 | 2.97 | 4.16 | 6.3 |  |
| $C_{28}$ | 0.72 |  | 0.87 | 0.66 | 0.91 | 0.94 | 7.9 |  |
| $C_{30}$ |  |  | 0.19 | 0.01 | 0.28 |  |  |  |
| $C_{32}$ |  |  |  |  | 0.05 |  |  |  |
| Paraffin |  |  |  |  |  | 5.07 | 3.8 |  |
| Olefin configuration, percent distribution ²— |  |  |  |  |  |  |  |  |
| α vinyl | 50.8 |  | 54.0 | 43.3 | 37.7 | 47.4 | 32.2 | ³45 |
| α vinylidene | 35.5 |  | 34.0 | 41.5 | 46.7 | 32.2 | 37.3 | ³45 |
| Internal | 13.8 |  | 12.0 | 15.4 | 15.6 | 20.4 | 30.4 | ³10 |

¹ Vapor phase chromatographic analysis.
² Nuclear magnetic resonance analysis.
³ Estimated.

The more preferred monoolefin mixtures can also be treated with an isomerization catalyst prior to being polymerized. The isomerization effected in this case is isomerization of the vinylidene type α-olefins to internal olefins. Thus, for example, isomerizing a $C_{12+}$ olefin mixture containing 30% vinyl α-olefins, 40% vinylidene α-olefins, and 30% internal olefins using a suitable catalyst such as silica gel, activated alumina and the like, the isomerized $C_{12+}$ olefin will now contain 30% vinyl-α-olefins, less than 40% vinylidene α-olefins and 30% + internal olefins, the + indicating the amount of vinylidene olefin isomerized to internal olefin. Depending on the extent of vinylidene olefin isomerization, the resulting isomerized monoolefin mixture may contain (a) α-olefins predominantly, (b) internal olefins predominantly, or (c) an equal amount of α olefins and internal olefins. In any event, such isomerized olefin mixtures are also useful to prepare the olefin hydrocarbons useful in the present invention.

The following examples will illustrate the preparation of preferred olefin hydrocarbons by Friedel-Crafts polymerization of mixtures of α-monoolefins of the type disclosed above. All parts are by weight unless otherwise indicated. The molecular weight of the olefin hydrocarbon products was determined by vapor phase osmometry.

Example 1

A vessel was charged with 383 parts of a $C_{18+}$ monoolefin mixture. To this olefin mixture was added 20 parts of aluminum chloride, gradually, over a 25-minute period. The vessel was cooled during the addition of the aluminum chloride in order to maintain the temperature of the reaction mixture at less than about 50° C. After the addition of the aluminum chloride was completed, the mixture was heated with stirring at 95° C. for 2 hours. Then, about 100 parts of a 10% HCl solution was added to quench the catalyst. The reaction mixture was then diluted with hexane (to facilitate handling) and it was washed with water until the washings were free of acid. The reaction mixture was then filtered through Celite. The filtrate was stripped of water and solvent under vacuum on a steam bath. The product obtained was 320 parts of a clear yellow slightly viscous liquid. The infrared spectrum of this product indicated it to be a polymerized hydrocarbon. The molecular weight was 818.

Similar results are obtained when aluminum bromide is used in Example 1 in place of the aluminum chloride. The reaction in Example 1 proceeds in an analogous manner when the reaction temperature is 0° C. and the reaction time is 12 hours; when the reaction temperature is 60° C. and the reaction time is 8 hours, or when the reaction time is increased to 3 hours.

Example 2

A vessel was flushed with nitrogen and then charged with 454 parts of a $C_{12+}$ monoolefin mixture. The olefin mixture was cooled to 15° C.; 15 parts of aluminum chloride were added to this olefin mixture over a 3–4 minute period. The reaction mixture was then heated with stirring at 70° C. for 2 hours. The catalyst was then quenched by adding about 150 parts of a 10% HCl solution to the mixture. About 350 parts of hexane were added (to facilitate handling) and the diluted mixture was washed with water until the washings were acid free. The reaction mixture was then filtered through Celite. The filtrate was stripped of water and solvent under vacuum on a steam bath. The product obtained was 308 parts of a clear, yellow, very fluid liquid. The molecular weight of this product was 368.

An analogous product is obtained when the reaction of Example 2 is carried out at 0° C. for 16 hours; at 145° C. for 30 minutes; or at 40° C. for 5 hours. Boron trifluoride is used with equal effectiveness in place of aluminum chloride in Example 2.

Example 3

A vessel was charged with 589 parts of a $C_{12+}$ monoolefin mixture and 16.8 parts of aluminum chloride were added over a 6-minute period. The mixture was then heated with stirring at 110° C. for 3 hours, cooled, diluted with hexane and then it was treated with about 200 parts of a 10% HCl solution. The reaction mixture was then washed with water until the washings were free of acid and then it was filtered. The filtrate was stripped of water and solvent under vacuum to yield 509 parts of a clear, yellow, liquid product. The molecular weight of this product was 378.

A similar reaction is obtained when a $C_{14+}$ monoolefin mixture is used in place of the $C_{12+}$ mixture in Example 3.

Example 4

A mixture of 400 parts of a $C_{12+}$ monoolefin mixture and 400 parts of a $C_{18+}$ monoolefin mixture was charged to a flask and cooled to 20° C. This mixture of monoolefins was treated with 40 parts of aluminum chloride, added gradually over a 72-minute period. During the addition of aluminum chloride, the temperature was maintained at 21° C. The reaction was continued with stirring at 22°–30° C. for 4 hours. The reaction mixture was then diluted with about 175 parts of hexane and then it was treated with about 200 parts of a 10% HCl solution. The mixture was then washed with water until acid free. It was filtered through Celite and the filtrate was stripped of solvent and water under vacuum. The product obtained was 696 parts of a clear, yellow liquid having a molecular weight of 623.

A similar reaction is obtained when 80 parts of aluminum chloride are used in Example 4. At a reaction temperature of 120° C. analogous results are obtained after a 1 hour reaction period.

Example 5

A vessel was charged with 600 parts of a $C_{12+}$ monoolefin mixture. To this olefin mixture was added 17.1 parts of aluminum chloride, gradually, over a 35-minute period. The temperature during this addition ranged from 20–23° C. The reaction was continued with stirring at 23° C. for 3¾ hours. The mixture was then diluted with about 175 parts of hexane and it was treated with about 250 parts of a 10% HCl solution. The mixture was then washed with water until acid free and it was then filtered through Celite. The filtrate was stripped under vacuum to yield 519 parts of a clear yellow liquid product having a molecular weight of 366.

In another run, 877 parts of a predominantly $\alpha$, $C_{18}$–$C_{28}$ range monoolefin mixture was polymerized using 75 parts of $AlCl_3$ at 70° C. for 2 hours to produce a useful olefin hydrocarbon additive.

Analogous results are obtained in Example 5 when 12 parts of aluminum chloride, or 12 parts of aluminum bromide are used as the catalyst; or when the $C_{12+}$ monoolefin mixture is isomerized by contacting the mixture with silica gel for a short period of time.

Example 6

The procedure of Example 5 is repeated except that a $C_{14+}$ monoolefin mixture is used and the reaction temperature is increased to 50° C. An analogous olefin hydrocarbon product is obtained, the molecular weight being somewhat higher than 366.

Example 7

A 100 gallon glass-lined kettle is charged with about 500 pounds of a $C_{12+}$ monoolefin mixture. The olefin mixture is cooled to about 20° C. with agitation. About 25 pounds of aluminum chloride are then added to the agitated olefin mixture. The temperature of the mixture rises to about 95° C. after the $AlCl_3$ addition. The mixture is cooled to about 50° C. A solution containing about 6.3 pounds 37% HCl and about 60.75 pounds of water is then added to the mixture and it is then heated to about 80° C. with agitation. When this temperature is reached, the agitation is discontinued and the mixture is allowed to stand for about 15 minutes. Two layers form and the lower aqueous layer is separated and discarded. The remaining material constitutes the polymerized olefin hydrocarbon reaction product. This product is washed twice with about 20 gallons of water allowing about a 15-minute settling period for adequate phase separation after each wash. The water layer, after each wash, is separated and discarded. Finally, the washed reaction product is subjected to distillation under reduced pressure (about 40 mm. Hg). The distillate is a mixture of water and light hydrocarbons. This distillate is separated and the light hydrocarbon portion (which is part of the reaction product) is dried and is returned to the distilled product. The final product containing the light hydrocarbon is then cooled to room temperature and filtered. The yield of polymerized hydrocarbon olefin product is about 99.4% based on the $C_{12+}$ olefin charged. The product is an amber colored clear fluid having an average molecular weight of less than about 500.

Using substantially the procedure of Example 7, a series of polymerized olefin hydrocarbons was prepared.

Properties of the polymerized olefin products thus obtained ranged as follows:

Physical appearance—amber fluid
Average molecular weight [1]=418–464
Flash point [2]=211°–264° F.
Viscosity at 20° C.=38–49 cs.
Density at 20° C.=0.818–0.820 g./ml.

[1] By osmometry.
[2] Cleveland open cup.

As pointed out above, the salts of phosphoric acids and organic amines are prepared by simply mixing the two components in proper proportions. Ordinarily, the base number of the amine and the acid number of the acid are obtained to determine what proportions should be used. By adjusting the ratio of amine to acid, salts can be prepared wherein acid is in excess, amine is in excess, or where the salt is substantially neutral. The substantially neutral salt is ordinarily preferred. By substantially neutral is meant that about one equivalent of acid is provided for each equivalent of amine. Commercial additives having such a composition are available.

Following is an example illustrating the preparation of a suitable salt.

Example 8

A mixture of organic amines having formulae of the type (i) and (ii) is prepared from N-(2-hydroxyethyl)-1,2-ethylenediamine and tall oil acids (mixture of unsaturated $C_{18}$ acids). A salt is then prepared by adding to this mixture of amines about 0.9 equivalent of a mixture of mono- and ditridecylorthophosphoric acids. An inert hydrocarbon diluent is generally added to facilitate handling.

The salt thus obtained is useful as an additive in gasoline.

The gasoline compositions of the present invention may contain the phosphoric acid/amine salt and the hydrocarbon olefin in a wide range of concentrations. The concentration of phosphoric acid/amine salt may vary from 10 to 100 parts per million (p.p.m.) by weight; the hydrocarbon olefin concentration may vary from 100 to 4000 p.p.m. Preferred concentration of said salt is from about 10 to 50 p.p.m.; and of hydrocarbon olefin is from about 300 to 2500 p.p.m. In general, the weight ratio of phosphoric acid/amine salt:hydrocarbon olefin in the gasoline is between 1:4 and 1:200 and preferably between 1:8 and 1:50. Preferred gasoline compositions contain between about 25 and 50 p.p.m. of alkyl phosphoric acid/amine salt and between about 400 and 2500 p.p.m. of hydrocarbon olefin. Most preferred gasoline compositions contain between 10 and 26 p.p.m. of said salt and between 1000 and 2500 p.p.m. of said hydrocarbon olefin.

In preparing the gasoline compositions, the aforesaid salt and hydrocarbon olefin additives may be added individually to the gasoline, utilizing standard blending procedures and equipment. The two components may also be blended to form a concentrate which in turn is added to the gasoline. These concentrates constitute another embodiment of the present invention. In addition to the salt/olefin hydrocarbon components, an inert gasoline compatible solvent may be used in preparing the concentrate. Other hydrocarbons such as toluene, benzene, hexane, petroleum streams, catalytic reformates and the like and/or alkanol may be useful. Use of such concentrates facilitates the maintenance of the desired ratio of said salt to said hydrocarbon olefin in the gasoline.

In addition to the phosphoric acid/amine salt and hydrocarbon olefin, the gasoline may also contain other gasoline additives provided these other additives do not adversely affect the present additive combination. Typical of such other additives are antiknock compounds such as tetraalkylleads, cyclomatic metal compounds such as (methylcyclopentadienyl)manganese tricarbonyl, ferrocene; scavengers such as the alkylene halides; deposit modifiers such as tricresyl phosphate, cresyl diphenyl phosphate; promoters such as tert-butyl acetate; antioxidants such as phenylene diamines, certain phenols and phosphites; anti-icers such as methanol, isopropanol; metal deactivators, dyes, corrosion inhibitors, and the like.

Any internal combustion engine gasoline base fuels may be used in preparing gasoline compositions of the present invention. Gasoline is generally a blend of hydrocarbons boiling from about 25° C. to about 225° C. which occurs naturally in petroleum and suitable hydrocarbons made from petroleum by processes such as thermal or catalytic cracking, reforming and the like. Hydrocarbon compositions of typical base gasolines are tabulated below, percentages are by volume.

TABLE 5.—BASE GASOLINES

| | A | B | C | D | E | F | G | H | J | K |
|---|---|---|---|---|---|---|---|---|---|---|
| Percent: | | | | | | | | | | |
| Aromatics | 29.0 | 30.0 | 16.0 | 24.0 | | | 5 | 45 | 80 | 38 |
| Olefinics | 3.0 | 4.0 | 12.0 | 12.5 | | 10 | | 30 | 20 | 7 |
| Saturates | 68.0 | 66.0 | 72.0 | 63.5 | 100 | 90 | 95 | 25 | | 55 |

Following are examples of gasoline compositions of the present invention. All parts and percentages are by weight unless otherwise indicated. In the compositions where lead was added, it was added as a tetraethyllead (TEL) antiknock fluid which also contained 1.0 theories of ethylene dichloride scavenger and 0.5 theories of ethylene dibromide scavenger. The term "theories" indicates that portion of the theoretical amount of halohydrocarbon scavenger required to provide sufficient halogen to convert all of the lead in the tetraalkyllead to leadhalide.

Example 9

A gasoline composition was prepared by adding to Base Gasoline B sufficient TEL antiknock fluid to provide 3.19 grams of lead per gallon as TEL, about 400 parts per million (p.p.m.) of olefin hydrocarbon prepared by the process of Example 7, and about 46 p.p.m. of a commercial, 52% solution of an alkylphosphoric acid/organic amine salt of the type described above.

Example 10

To Base Gasoline A was added sufficient TEL antiknock fluid to provide 3.21 grams of lead per gallon as TEL, about 2000 p.p.m. of olefin hydrocarbon prepared by the method of Example 7 and about 46 p.p.m. of a commercial, 52% solution of an alkylphosphoric acid/organic amine salt of the type described above.

Example 11

To Base Gasoline C was added about 23 p.p.m. of a 52% solution of a salt of Example 8, in aromatic petroleum hydrocarbons, and about 400 p.p.m. of an olefin hydrocarbon prepared by the method of Example 7.

Example 12

A gasoline composition was prepared by adding to Base Gasoline C about 46 p.p.m. of a 52% solution, in aromatic petroleum hydrocarbons, of a salt of Example 8 and about 400 p.p.m. of an olefin hydrocarbon prepared by the method of Example 7.

Example 13

To Base Gasoline C was added about 2000 p.p.m. of an olefin hydrocarbon prepared by the process of Example 7 and about 46 p.p.m. of a commercial, 52% solution of an alkylphosphoric acid/amine salt of the type described above.

Example 14

To Base Gasoline B was added sufficient TEL antiknock fluid to provide 3.19 grams of lead per gallon as TEL, about 400 p.p.m. of olefin hydrocarbon prepared by the process of Example 7 and about 23 p.p.m. of a commercial, 52% solution of an alkylphosphoric acid/organic amine salt of the type described above.

Example 15

To Base Gasoline B was added sufficient TEL antiknock fluid to provide 3.19 grams of lead per gallon as TEL, about 400 p.p.m. of olefin hydrocarbon prepared by the process of Example 7 and about 46 p.p.m. of a commercial, 52% solution of an alkylphosphoric acid/organic amine salt of the type described above.

Other examples of fuel compositions of the present invention are found in the following table.

The data in Table 7 illustrates that the present additive combination effectively reduces intake valve deposits by up to 90% (Test 3). This deposit reduction is at least equal to and, on a p.p.m. effectiveness basis, better than a commercial additive C (Test 4).

The carburetor detergency test procedure also involved use of a 6-cylinder automobile engine. The carburetor was fitted with a split, removable, internal throttle-body sleeve. The procedure involved a schedule of running the engine

TABLE 6

| Example | Base fuel | (A) Hydrocarbon olefin Prepared from— | MW [1] | Concentration of (A), p.p.m. | (B) Amine salt Phosphoric acid (equivalent) [2] | Amine from (equivalent) | Concentration of (B), p.p.m. |
|---|---|---|---|---|---|---|---|
| 16 | D | Example 1 | 818 | 400 | Octyldihydrogen phosphate (1.5) | Oleic acid/ethylene diamine (1) | 40 |
| 17 | E | Example 2 | 368 | 4,000 | Dieicosyl hydrogen phosphate (1) | Stearic acid/N-(2-aminoethyl)-1,2-ethylene diamine (1.5). | 20 |
| 18 | F | Example 3 | 378 | 2,500 | Diundecyl hydrogen phosphate (1) | Lauric acid/N-oleyl-1,2-ethylene diamine (1). | 25 |
| 19 | G | Example 4 | 623 | 700 | Methyl dihydrogen phosphate (1.1) | Octanoic acid/N-(2-hydroxyethyl)-1,3-propylene diamine (1). | 10 |
| 20 | H | Example 5 | 366 | 1,800 | Diphenyl hydrogen phosphate (1) | Linoleic acid/propylene diamine (1.1) | 36 |
| 21 | J | $C_{12+}$ olefin—C' | 450 | 1,000 | Diisopropyl hydrogen phosphate (2) | Myristic acid/N-(2-hydroxyethyl)-1,2-ethylene diamine (1). | 100 |
| 22 | K | $C_{14+}$ olefin—D | 400 | 3,000 | Cyclohexyldihydrogen phosphate (1) | Palmitic acid/N-decyl-1,2-ethylene diamine (1). | 15 |
| 23 | A | $C_{18+}$ olefin—K | 750 | 900 | Tolyl dihydrogen phosphate (1) | Corn oil acids/N-(2-aminoethyl)-1,3-propylene diamine (1.1). | 60 |
| 24 | B | $C_{18+}$ olefin—N | 1,500 | 100 | Dipentadecyl hydrogen phosphate (1) | Tallow acids/N-(2-hydroxyethyl)-1,2-ethylene diamine (1). | 25 |
| 25 | C | Mixed $C_{13}/C_{15}$ olefins. | 350 | 1,500 | Octadecyl dihydrogen phosphate (1) | Butyric acid/N-dodecyl-1,2-ethylene diamine (2). | 45 |

[1] Average molecular weight.   [2] Equivalents.

The fuel compositions of the present invention effectively reduce build-up of deposits in the intake system and especially on the underhead side of the intake valves; the hydrocarbon olefin/amine phosphate additive compositions are also effective carburetor detergents and anti-icers. The carburetor detergency, anti-icing, and intake system deposit reducing effectiveness of the present gasoline compositions were determined in actual engine tests.

The test procedure for the intake system deposit reducing effect involved running a standard 6-cylinder automobile engine on the gasoline fuel to be tested for a total of 30 hours on a severe intake valve deposit cycle. This cycle consisted of running the engine for 150 seconds at 2000 revolutions per minute (r.p.m.) followed by 40 seconds at 500 r.p.m. for a total of 30 hours. At the end of this 30 hour test run, the manifold and head assemblies of the engine were removed for inspection. The intake valves were removed, weighed and photographed. The valves were then cleaned to remove all the accumulated deposits and reweighed. The total deposit weight was obtained by subtracting the weight of the valves after they had been cleaned from the weight of the valves with the accumulated deposits. In this way, a direct measure of the effect of an additive on intake valve deposit formation was obtained.

The following table contains data obtained in a series of such engine tests.

TABLE 7.—INTAKE VALVE DEPOSIT REDUCTION

| Test No. | Gasoline composition [1] | Amount of additive (p.p.m.) | Intake valve deposits (grams) | Deposit reduction, percent |
|---|---|---|---|---|
| 1 | Base gasoline A [2] | None | 3.2176 | |
| 2 | Base gasoline A, hydrocarbon olefin and alkylphosphate/amine (Example 9). | 400 46 | 1.2425 | 65 |
| 3 | Base gasoline B, hydrocarbon olefin and alkylphosphate/amine (Example 10). | 2,000 46 | 0.2641 | 90 |
| 4 | Base gasoline B and additive "C" [3]. | 4,000 | 0.3387 | 86 |

[1] All the gasoline compositions contained substantially equal amounts of said TEL antiknock fluid.
[2] Base gasolines designated A and B are different lots of the same commercial gasoline hydrocarbon blend.
[3] Additive "C" is a commercial intake system deposit reducing gasoline additive which contains about 35% by weight of low boiling petroleum fraction diluent.

through a cycle which involved idle (5 minutes), followed by part throttle (70) operation. This cycle is repeated until a fixed amount of gasoline is burned in the engine. The air fed into the carburetor also includes blowby. The test is started with a clean throttle body sleeve which has been weighed. At the conclusion of the test cycle, the throttle body sleeve is removed and reweighed. In this way the actual amount of deposits in the carburetor throttle body are obtained. The data from this test is reported as percent decrease in the throttle body deposits as compared with the base line fuel. The base line fuel is the gasoline composition minus the additive being tested for carburetor detergency. The following table contains data for a series of engine tests demonstrating carburetor detergency of the present additives.

TABLE 8

| | Carburetor detergency |
|---|---|
| Test No. | Gasoline composition | Deposit reduction in throttle body, percent |
| 5 | Example 15 | 50 |
| 6 | Example 10 | 48 |

The additive compositions of the present invention as the data in Table 8 illustrate, are effective in reducing deposits formed in the carburetor throttle body.

Anti-icing effectiveness of the fuel compositions was determined using a procedure which consists of cycling a 6-cylinder engine without load between medium and low speeds while using controlled humidity carburetor intake air. When ice forms on the carburetor throttle plate or around the idle passages, stalling occurs during the low speed portion of the cycle. After a stall the engine is immediately restarted on another cycle. The anti-icing criterion is the number of stalls which occur before warm-up is accomplished. The anti-icing effectiveness is reported as the percent reduction in stalls for the test fuel as compared with the aforesaid base line. Ordinarily, the percent improvement is an average of from about three to about five icing tests. The following table contains anti-icing data from such tests.

TABLE 9

| Test No. | Gasoline composition | Anti-icing effectiveness Reduction in stalls, percent |
|---|---|---|
| 7 | Example 11 | 35 |
| 8 | Example 12 | 54 |
| 9 | Example 13 | 46 |

The data in Table 9 clearly shows the anti-icing effectiveness of the present additive combination.

Similar anti-icing carburetor detergency and intake system deposit reducing effectiveness is obtained using the combination of hydrocarbon olefins and amine phosphates disclosed herein.

The present invention is embodied in improved gasoline compositions and additive concentrations useful to prepare such compositions.

I claim:
1. Gasoline containing
   (1) from about 10 to about 100 parts per million by weight of a salt of
      (a) alkyl phosphoric acid having the formula

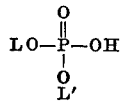

wherein L and L' are independently selected from H and alkyl groups having 1–20 carbon atoms such that at least one of L and L' is said alkyl group, and
      (b) organic amine selected from compounds having the composition (i) 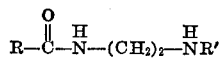

(ii) 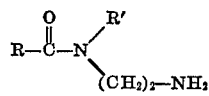

(iii) 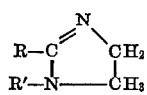

(iiii) mixtures of (i) and (ii)

(iiiii) mixtures of (i), (ii), and (iii)

wherein R is an acyclic hydrocarbon radical having 11 to 19 carbon atoms, R' is selected from the group consisting of hydrogen, $C_2$–$C_4$ alkyl, 2-hydroxyethyl and 2-aminoethyl, and
   (2) from 100 to about 4000 parts per million by weight of a non-aromatic normally liquid olefin hydrocarbon having an average molecular weight of from 350 to about 1500 wherein said olefin hydrocarbon is prepared by polymerization of mixtures of monoolefins having about 12 or more carbon atoms.

2. The gasoline composition of claim 1 wherein said polymerization is carried out using a Friedel-Crafts catalyst.

3. The gasoline composition of claim 2 wherein said Friedel-Crafts catalyst is selected from aluminum chloride, aluminum bromide and boron trifluoride and said polymerization is carried out at temperatures ranging from 0° C. to about 145° C.

4. The gasoline composition of claim 3 wherein said monoolefin mixture is a mixture containing 30 percent or more alpha monolefins having from about 12 to about 32 carbon atoms.

5. The gasoline composition of claim 4 wherein said monoolefins are predominantly alpha.

6. The gasoline composition of claim 5 wherein said monoolefins are even carbon numbered.

7. The gasoline composition of claim 4 wherein said catalyst is aluminum chloride and said reaction temperature is from about 20° C. to about 110° C.

8. The gasoline composition of claim 5 wherein said catalyst is aluminum chloride and said reaction temperature is from about 20° C. to about 110° C.

9. The gasoline composition of claim 6 wherein said catalyst is aluminum chloride and said reaction temperature is from about 20° C. to about 110° C.

10. The gasoline composition of claim 1 wherein the amount of said salt is from 10 to 50 parts per million by weight, and the amount of said olefin hydrocarbon is from about 300 to about 2500 parts per million by weight.

11. The gasoline composition of claim 10 wherein the amount of said olefin hydrocarbon is about 1000 to 2500 parts per million by weight.

12. The gasoline composition of claim 1 wherein L and L' are independently selected from hydrogen and alkyl groups having 8–20 carbon atoms.

13. The gasoline composition of claim 4 wherein L and L' are independently selected from hydrogen and alkyl groups having 8–20 carbon atoms.

14. The gasoline composition of claim 1 wherein L and L' are independently selected from hydrogen and alkyl groups having 8 to about 16 carbon atoms.

15. The gasoline composition of claim 4 wherein L and L' are independently selected from hydrogen and alkyl groups having 8 to about 16 carbon atoms.

16. The gasoline composition of claim 1 wherein R is an alkenyl radical.

17. The gasoline composition of claim 12 wherein R is an alkenyl radical.

18. The gasoline composition of claim 17 wherein R' is 2-hydroxyethyl.

19. The gasoline composition of claim 12 wherein said organic amine has the composition (iiii).

20. The gasoline composition of claim 13 wherein said organic amine has the composition (iiii).

21. The gasoline composition of claim 20 wherein R is alkenyl.

22. The gasoline composition of claim 21 wherein R' is 2-hydroxyethyl.

23. The gasoline composition of claim 22 wherein R has 17 carbon atoms.

24. The gasoline composition of claim 1 wherein said olefin hydrocarbon is prepared by polymerizing a mixture of even carbon numbered, predominantly α-monoolefins having from 12 to about 32 carbon atoms using from 2 percent to 10 percent by weight based on the α-monoolefin, of a catalyst selected from aluminum chloride, aluminum bromide and boron trifluoride, at reaction temperatures ranging from 0° C. to about 145° C.

25. The gasoline composition of claim 1 wherein said olefin hydrocarbon is prepared by polymerizing a mixture of even carbon numbered monoolefins having from about 12 to about 32 carbon atoms where at least 30 percent of said monoolefins have the vinyl olefin configuration and the remainder have an internal olefin configuration using from 2 percent to 10 percent by weight based on the monoolefin of a catalyst selected from aluminum chloride, aluminum bromide, and boron trifluoride, at reaction temperatures ranging from about 20° C. to about 110° C.

26. The gasoline composition of claim 1 wherein said olefin hydrocarbon is prepared by polymerizing a mixture of even carbon numbered monoolefins having from about 12 to about 32 carbon atoms where at least 30 percent of said monoolefins have the vinyl olefin configuration, at least 29 percent have the vinylidene olefin configuration and the remainder have an internal olefin configuration, using from 2 percent to 10 percent by weight based on the monoolefin, of a catalyst selected from aluminum chloride, aluminum bromide, and boron trifluoride, at reaction 27. The gasoline composition of claim 1 wherein said olefin hydrocarbon is prepared by polymerizing a mixture of even carbon numbered, monoolefins ranging predominantly from $C_{18}$–$C_{28}$ wherein at least 30 percent of the monoolefins are vinyl, at least 30 percent are vinylidene, and the remainder are internal olefins using from 2 percent to 10 percent by weight based on the monoolefin, of a catalyst selected from aluminum chloride, aluminum bromide, and boron trifluoride, at reaction temperatures of from 20° C. to 110° C.

28. The gasoline composition of claim 1 wherein said olefin hydrocarbon is prepared by polymerizing a mixture of even carbon numbered monoolefins ranging predominantly from $C_{14}$–$C_{32}$ wherein at least 30 percent of the monoolefins are vinyl, at least 29 percent are vinylidene and the remainder are internal olefins using from 2 percent to 10 percent by weight based on the monoolefin, of a catalyst selected from aluminum chloride, aluminum bromide, and boron trifluoride, at reaction temperatures of from 20° C. to 110° C.

29. The gasoline composition of claim 24 wherein said catalyst is aluminum chloride, said reaction temperature ranges from 20° C.–110° C., and said polymerization being carried out in the absence of $C_1$–$C_6$ alkyl monohalide.

30. The gasoline composition of claim 25 wherein said catalyst is aluminum chloride, said reaction temperature ranges from 20° C.–110° C., and said polymerization being carried out in the absence of $C_1$–$C_6$ alkyl monohalide.

31. The gasoline composition of claim 26 wherein said catalyst is aluminum chloride, said reaction temperature ranges from 20° C.–110° C., and said polymerization being carried out in the absence of $C_1$–$C_6$ alkyl monohalide.

32. The gasoline composition of claim 28 wherein said catalyst is aluminum chloride, said reaction temperature ranges from 20° C.–110° C., and said polymerization being carried out in the absence of $C_1$–$C_6$ alkyl monohalide.

33. The gasoline composition of claim 24 wherein the concentration of said salt is 10–50 parts per million by weight and of said olefin hydrocarbon is 300 to 2500 parts per million by weight.

34. The gasoline composition of claim 24 wherein the concentration of said salt is 10–50 parts per million by weight and of said olefin hydrocarbon is 300 to 2500 parts per million by weight.

35. The gasoline composition of claim 30 wherein the concentration of said salt is 10–50 parts per million by weight and of said olefin hydrocarbon is 300 to 2500 parts per million by weight.

36. The gasoline composition of claim 24 wherein L and L' are independently selected from hydrogen and alkyl groups having from 8–20 carbon atoms.

37. The gasoline composition of claim 36 wherein said organic amine has the composition (iiii).

38. The gasoline composition of claim 30 wherein L and L' are independently selected from hydrogen and alkyl groups having 8–20 carbon atoms, said organic amine has the composition (iiii) and R is alkenyl.

39. The gasoline composition of claim 38 wherein R has 17 carbon atoms and R' is 2-hydroxyethyl.

40. The gasoline composition of claim 1 additionally containing from 0.5 to about 4 grams of lead per gallon as tetraalkyllead antiknock agent and from 0.5 to 1.6 theories of halohydrocarbon scavenger.

41. The gasoline composition of claim 1 wherein said average molecular weight ranges from 350 to about 500.

42. The gasoline composition of claim 4 wherein said average molecular weight ranges from 350 to about 500.

43. The gasoline composition of claim 7 wherein said average molecular weight ranges from 350 to about 500.

44. The gasoline composition of claim 18 wherein said average molecular weight ranges from 350 to about 500.

45. The gasoline composition of claim 24 wherein said average molecular weight ranges from 350 to about 500.

46. The gasoline composition of claim 25 wherein said average molecular weight ranges from 350 to about 500.

47. The gasoline composition of claim 30 wherein said average molecular weight ranges from 350 to about 500.

48. The gasoline composition of claim 36 wherein said average molecular weight ranges from 350 to about 500.

49. The gasoline composition of claim 39 wherein said average molecular weight ranges from 350 to about 500.

50. An additive concentrate containing
(1) a salt of
(a) alkyl phosphoric acid having the formula $$LO-\underset{\underset{L'}{|}}{\overset{\overset{O}{\|}}{P}}-OH$$

wherein L and L' are independently selected from H and alkyl groups having 1–20 carbon atoms such that at least one of L and L' is said alkyl group, and
(b) organic amine selected from compounds having the composition (i) $R-\overset{\overset{O}{\|}}{C}-\overset{H}{N}-(CH_2)_2-\overset{H}{N}R'$ (ii) $R-\overset{\overset{O}{\|}}{C}-N\diagdown_{(CH_2)_2-NH_2}^{R'}$ (iii) $\begin{array}{c} R-C\diagup^{N}\diagdown CH_2 \\ | \quad\quad\quad | \\ R'-N\text{———}CH_2 \end{array}$ (iiii) mixtures of (i) and (ii)

(iiiii) mixtures of (i), (ii), and (iii)

wherein R is an acyclic hydrocarbon radical having 11 to 19 carbon atoms, R' is selected from the group consisting of hydrogen, $C_2$–$C_4$ alkyl, 2-hydroxyethyl and 2-aminoethyl, and
(2) a non-aromatic normally liquid olefin hydrocarbon having an average molecular weight of from 350 to about 1500 wherein said olefin hydrocarbon is prepared by polymerization of mixtures of monoolefins having about 12 or more carbon atoms,
the weight ratio of said salt (1):said olefin hydrocarbon (2) being from about 1–10:10–400.

51. The additive concentrate of claim 50 wherein said polymerization is carried out using a Friedel-Crafts catalyst selected from aluminum chloride, aluminum bromide, and boron trifluoride, said monoolefin mixture is a mixture containing 30% or more α-monoolefins having from about 12 to about 32 carbon atoms and said polymerization is carried out at temperatures ranging from 0° C. to about 145° C.

52. The additive concentrate of claim 50 wherein said ratio is 1–5:30–250.

53. The additive concentrate of claim 52 wherein said ratio is 1–5:100–250.

54. The additive concentrate of claim 51 wherein L and L' are independently selected from hydrogen and alkyl groups having 8–20 carbon atoms.

55. The additive concentrate of claim 50 wherein L and L' are independently selected from hydrogen and alkyl groups having 8–20 carbon atoms and said organic amine has the composition (iiii).

56. The additive concentrate of claim 50 wherein said organic amine has the composition (iiii), R is alkenyl, and R' is 2-hydroxyethyl.

57. The additive concentrate of claim 54 wherein said olefin hydrocarbon is prepared by polymerizing a mixture of even carbon numbered, predominantly α-monoolefins having from about 12 to about 30 carbon atoms using from 2%–10% by weight based on the α-monoolefin of a catalyst selected from aluminum chloride, aluminum bromide, and boron trifluoride at reaction temperatures ranging from 0° C. to about 145° C.

58. The additive concentrate of claim 50 wherein said olefin hydrocarbon is prepared by polymerizing a mixture of even carbon numbered monoolefins having from about 12 to about 32 carbon atoms where at least 30% of said monoolefins have the vinyl olefin configuration and the remainder have an internal olefin configuration using from 2%–10% by weight based on the monoloefin of a catalyst selected from aluminum chloride, aluminum bromide, and boron trifluoride, at reaction temperatures ranging from about 20° C. to about 110° C.

59. The additive concentration of claim 58 wherein said catalyst is aluminum chloride, said reaction temperature ranges from 20° C.–110° C. and said polymerization being carried out in the absence of $C_1$-$C_6$ alkyl monohalide.

60. The additive concentrate of claim 57 wherein L and L' are independently selected from hydrogen and alkyl groups having from 8–20 carbon atoms and said organic amine has the composition (iiii).

61. The additive concentrate of claim 59 wherein L and L' are independently selected from hydrogen and alkyl groups having 8–20 carbon atoms, said organic amine has the composition (iiii), R is alkenyl and has 17 carbon atoms, and R' is 2-hydroxyethyl.

References Cited

UNITED STATES PATENTS

| | | | |
|---|---|---|---|
| 3,384,466 | 5/1968 | Popkin | 44—72 |
| 3,399,982 | 9/1968 | Kautsky | 44—72 |
| 3,475,369 | 10/1969 | Blunt | 44—80 |
| 3,502,451 | 3/1970 | Moore et al. | 44—58 |
| 3,558,737 | 1/1971 | Saines | 44—80 |
| 2,852,579 | 9/1958 | Walkey | 44—80 |

DANIEL E. WYMAN, Primary Examiner

Y. H. SMITH, Assistant Examiner

U.S. Cl. X.R.

44—Dig. 1, 71

PO-1050
(5/69)

UNITED STATES PATENT OFFICE
CERTIFICATE OF CORRECTION

Patent No. 3,703,360      Dated November 21, 1972

Inventor(s) Warren L. Perilstein

It is certified that error appears in the above-identified patent and that said Letters Patent are hereby corrected as shown below:

In Column 2, line 33, after "such" insert phrase -- organo phosphoric acids are phenyl dihydrogen phos --;

In Column 5, Table 1, under heading "C'" insert footnote -- $_2$ --;

In Columns 11, 12, Table 6, between "Phosphoric Acid (Equiv)" and "Amine from (Equiv)" insert designation -- : --;

In Column 15, Claim 34 should depend on Claim 25 rather than Claim 24;

In Column 17, Claim 58, line 9, "monoloefin" should read -- monoolefin --

Signed and sealed this 24th day of April 1973.

(SEAL)
Attest:

EDWARD M. FLETCHER, JR.
Attesting Officer

ROBERT GOTTSCHALK
Commissioner of Patents